Oct. 2, 1962   P. K. BODGE   3,056,291
FLOWMETER
Filed Oct. 22, 1958   2 Sheets-Sheet 1

INVENTOR.
Philip K. Bodge
BY  M W Goodwin
His Attorney

Oct. 2, 1962 P. K. BODGE 3,056,291
FLOWMETER
Filed Oct. 22, 1958 2 Sheets-Sheet 2

INVENTOR.
Philip K. Bodge
BY M W Goodwin

His Attorney

United States Patent Office 3,056,291
Patented Oct. 2, 1962

3,056,291
FLOWMETER
Philip K. Bodge, Swampscott, Mass., assignor to General Electric Company, a corporation of New York
Filed Oct. 22, 1958, Ser. No. 768,798
13 Claims. (Cl. 73—194)

This invention relates to mass flowmeters of the angular momentum type and, more particularly, to a novel and improved single element angular momentum type flowmeter adapted to be used for measuring mass flow of a fluid in either of opposite directions of fluid flow through a conduit.

Single element mass flowmeters of the angular momentum type have heretofore been known, an example of the same being disclosed in my prior Patent No. 2,814,949, issued December 3, 1957. Such flowmeters generally comprise a casing adapted to be connected in a fluid conduit, a fluid accelerating impeller disposed within the casing, a drive motor connected to the impeller, and means to provide a signal proportionally related to the torque imparted to the impeller by the motor in providing the desired acceleration of the fluid, this torque being proportional to the mass flow of fluid through the flowmeter. The means for obtaining the desired torque signal may be of a dynamometer type, as shown in my prior patent, wherein the drive motor stator is mounted for resiliently restrained movement about the axis of the rotor of the drive motor. While such an arrangement is satisfactory, it is desired to provide improved means for obtaining the desired torque signal which will provide increased accuracy, particularly in the relatively low flow rate application wherein there is a relatively large weight-to-signal ratio of the moving signal producing elements.

Accordingly, it is a primary object of this invention to provide a single element angular momentum type mass flowmeter having novel and improved means for providing a signal proportional to impeller torque which will have an improved torque signal-to-weight ratio, thus reducing inertia and friction effects in the system and improving the accuracy of the flowmeter, particularly in relatively low flow rate applications.

It is a further object of this invention to provide a flowmeter of the type described which can be utilized to sense mass flow of fluid alternately in either of opposite directions of fluid flow through a conduit.

It is another object of this invention to provide a flowmeter of the type described wherein the impeller torque sensing means is of relatively simple and straightforward construction and which is rugged to assure trouble-free service over an extended service life.

It is still another object of this invention to provide a mass flowmeter of the type described having improved means for reducing, if not eliminating, viscosity errors within the flowmeter.

Other objects and advantages will be in part obvious and in part pointed out in detail hereinafter.

In one aspect of the invention, there is provided a single element, angular momentum type flowmeter comprising a casing adapted to be coupled in a fluid conduit, a fluid accelerating impeller rotatably supported within the casing, and a constant speed drive motor disposed within the casing for rotating the impeller. In accordance with one embodiment of the invention, the impeller is drivingly connected to the motor by an epicyclic gear train including a planet gear mounted on the impeller for rotation about an axis spaced from and parallel with the impeller axis and drivingly connected to the drive motor. A sun gear disposed coaxially of the impeller is engaged with the planet gear in driven relationship and is supported on the casing separate from the impeller for resiliently restrained movement proportional to the torque exerted thereon by the planet gear during operation of the drive motor. Means are provided to sense the deflection of the sun gear to provide a signal proportional to impeller torque and thus mass flow of fluid.

A more detailed understanding of the structure of the invention may be had by reference to the following description taken in connection with the accompanying drawings, in which.

Figure 1:
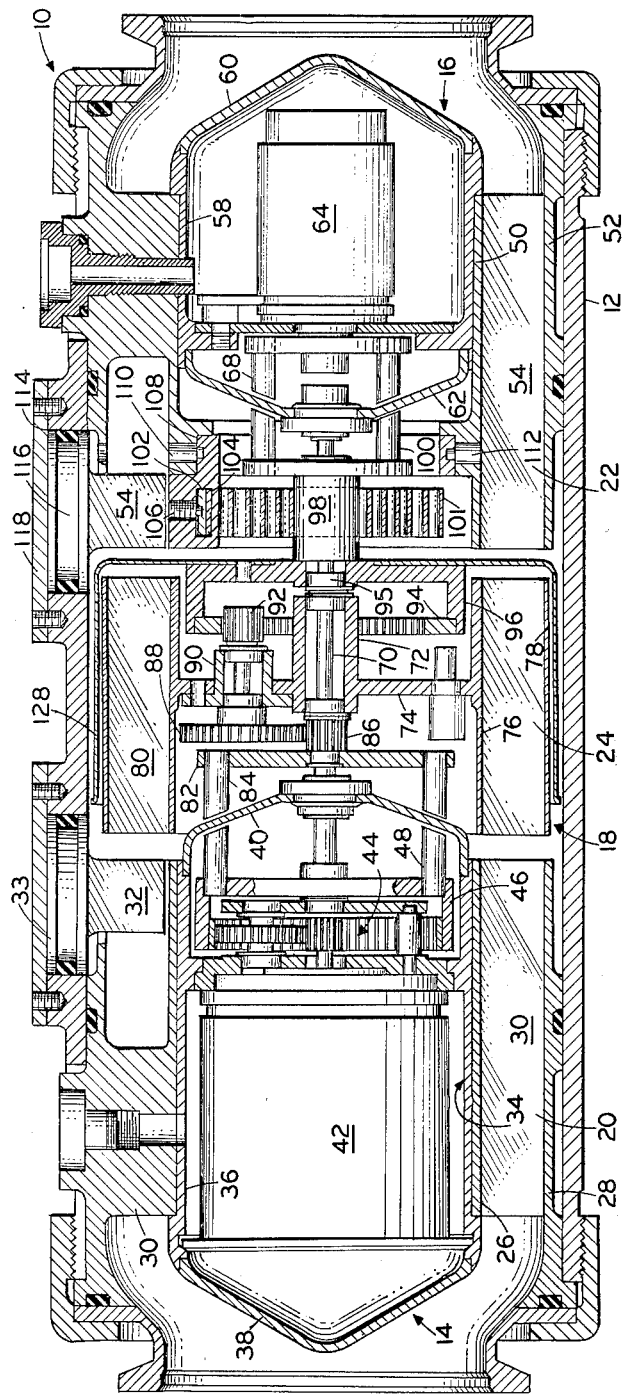
FIGURE 1 is a longitudinal cross sectional view of a two way single element angular momentum type mass flowmeter embodying the present invention.
Figure 2:
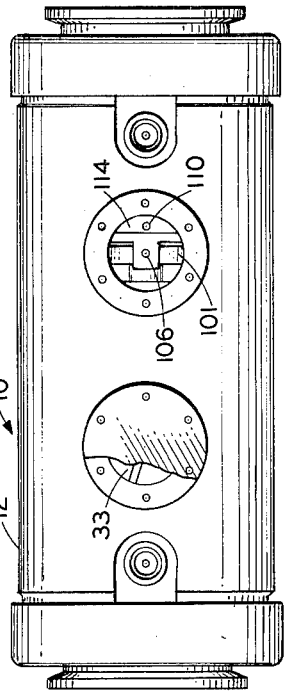
FIGURE 2 is a reduced plan view of the flowmeter of FIGURE 1.

With reference to FIGURES 1 and 2 of the drawings, the flowmeter shown therein comprises the casing 10 including an outer tubular shell 12, within the opposite ends of which are received coaxially disposed axially spaced flow straighteners 14 and 16 and a fluid accelerating impeller 18 rotatably supported on and coaxially between the flow straighteners. A generally annular fluid flow passage extending coaxially through the casing is provided by a plurality of circularly arranged elongated linear fluid passages 20, 22 and 24 and the flow straighteners 14 and 16 and impeller 18, respectively.

The flow straightener 14 includes a cylindrical inner wall or hub 26, a cylindrical outer wall 28 sealingly received within the casing 10, and a plurality of circularly arranged, angularly spaced walls or partitions 30 extending radially between the walls 26 and 28 to separate the flow passages 20. One of the walls 30 is cut back from one end thereof. A relatively short compensating vane 32 is rotatably supported by its hub 33 on the casing 10 and extends generally radially inwardly and longitudinally of the casing and generally in line with the shortened wall 30 to provide for correction of any inaccuracies in longitudinal alignment of the flow passages in the flow straighteners and impeller.

A fluid sealed motor housing 34 is supported by the flow straightener 14 and includes a cylindrical body 36 engaged concentrically within the inner wall 26 of the flow straightener, a streamlined cover 38 closing the outer end of the body 36, and a sealing member 40 closing the opposite or inner end of the body 36. A synchronous electric motor 42 is disposed within the housing 34 and supported on the body 36. The motor is connected through a drive gear train 44 to a magnet carrier 46 mounting a plurality of magnets 48 disposed within the housing 34.

The flow straightener 16 is generally similar to the flow straightener 14, comprising an inner cylindrical wall 50, outer cylindrical wall 52, and walls or partitions 54 extending radially between the outer and inner walls 50 and 52. A compensating vane 54 is provided in conjunction with the flow straightener 16 in the same manner and for the same purpose as in the case of flow straightener 14. A fluid sealed housing is engaged within the inner wall 50 of the flow straightener 16 and comprises a generally cylindrical body 58, a streamlined closure member or cover 60 sealing the outer end of the body 58, and a sealing member 62 sealing the inner end of the body 58. Supported within the housing is a position telemetering device 64 which in the specific embodiment is a synchro having an input shaft connected to a magnet carrier mounting a plurality of magnets 68 disposed within the sealed housing of the flow straightener 16.

A shaft 70 extends coaxially of the flow straighteners 14 and 16 and is rotatably supported at its opposite ends in bearings mounted on the sealing members 40 and 62 of the flow straighteners 14 and 16, respectively. The impeller 18 is disposed coaxially of the shaft 70 and comprises a hub 72 rotatably mounted on bearings on the shaft 70. A web 74 extends radially outwardly from the hub 72 and supports the main impeller body comprising an inner cylindrical wall 76 and a concentrically arranged outer cylindrical wall 78. Partitions or walls 80 extend radially of the impeller between the outer and inner walls 76, 78 thereof to separate the flow passages 24 in the impeller.

Mounted for rotation with the shaft 70 is a magnet carrier 82 mounting a plurality of magnets 84 cooperating with the magnets 48 within the housing 34 to provide for rotation of the shaft 70 in response to operation of the motor 42. A pinion 86 is mounted for rotation with the shaft 70 and is engaged with a gear 88 rotatably supported in bearings carried by a bushing 90 mounted on the web 74 of the impeller. A planet gear 92 is mounted for rotation with the gear 88 about an axis extending in radially spaced parallel relationship with the impeller axis and is engaged with a sun gear 94 disposed coaxially of the impeller axis and carried by a supporting member 96 having a central hub 98 rotatably supported by spaced bearings 95 (only one of which is shown) on the shaft 70 for movement coaxially about the impeller axis. Mounted for rotation with the hub 98 of the sun gear supporting member 96 is a magnet carrier mounting a plurality of magnets 100 cooperating with the magnets 68 within the housing 16 to provide for deflection of the synchro shaft in response to deflection of the sun gear 94.

A coiled torsion spring 101 is disposed concentrically of the hub 98 and connected at its inner end to the hub and at its outer end to the casing 10 by means of a spring clamp 102 having a clamping plate 104 engaged with the outer end of the spring by a set screw 106. The clamp 102 has a hub 108 rotatably engaged in an annular recess in the inner end of the inner wall 50 of the flow straightener 16. The hub 108 is provided with an external annular groove in which is engaged an end projection on a pair of set screws 110, 112 threadably received in the flow straightener wall 50. The projections on the set screws retain the clamp on the flow straightener and the projection on the set screw 110 preferably bottoms in the groove on the hub 108 to lock the clamp in adjusted angular relation. As most clearly seen in FIGURE 2, the set screws 106 and 110 register with the opening 114 in the casing 10 in which the hub 116 of the compensating vane 54 is rotatably received. Upon removal of the cover plate 118 enclosing the hub 116 and removal of the vane 54, access may be had to the set screw 106 to permit adjustment of the outer end of the spring 101 relative to the clamp for adjustment of the spring force and access may be had to the set screw 110 to permit angular adjustment of the clamp relative to the impeller axis for adjusting the zero position of the sun gear.

It should be particularly noted that the bearings 95 supporting the sun gear hub 98 are in the preferred embodiment roller or ball bearings having an inner race fixed to the shaft 70 and an outer race fixed to the hub 98. In this manner the inner races of the bearings are continually rotated during operation of the flowmeter and provide an important reduction in any friction error present in the deflection signal of the sun gear 94. Also, the dynamic condition of the bearings 95 assures that in the event there is any dirt or other foreign substance in the fluid, the bearings will not become jammed to prevent deflection of the sun gear 94, nor will the dirt or foreign matter cause an undesirable increase in bearing friction which would result in an erroneous signal from the deflecting sun gear.

In the operation of the flowmeter just described, the casing 10 is connected in a fluid conduit for entrance of fluid either through the flow straightener 14 or 16, as desired, it being apparent that the flowmeter is operative in either of both directions of fluid flow therethrough. Upon operation of the motor 42, the impeller 18 will be rotated to impart angular acceleration to the fluid flowing through the flowmeter, with said acceleration being in a direction angularly about the axis of the impeller. The torque exerted on the impeller by the planet gear 92 to obtain rotation of the impeller about its axis will be reflected in a proportional angular deflection of the resiliently restrained sun gear 94. Inasmuch as the output torque of the impeller provides the most accurate measurement of the momentum torque imparted to the fluid by the impeller, it is apparent that the sensing of the input torque to the impeller in the manner accomplished by this invention will provide a reasonably accurate measurement of the momentum torque imparted to the fluid by the impeller. Further, as will be apparent, the torque exerted on the sun gear supporting member 96 will be relatively high as compared to the weight of the deflecting structure, thus minimizing inertia and friction effects of the deflecting structure which might affect flowmeter accuracy under transient conditions, particularly in low flow rate applications. Additionally, the mechanical means for providing the impeller torque signal is of relatively simple and straight forward construction, and while rugged so as to provide extended trouble-free service is also sensitive and accurate.

Figure 3:
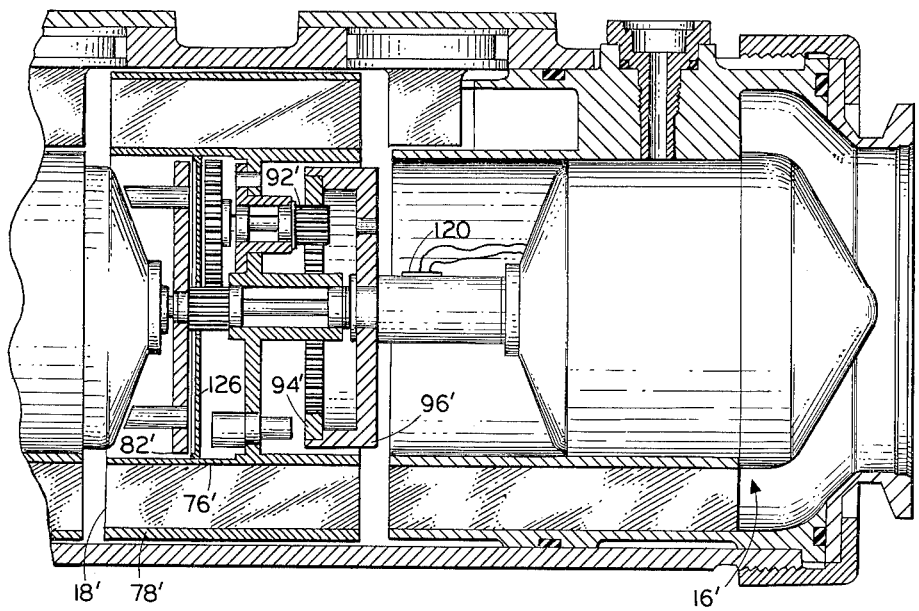
FIGURE 3 is a fragmentary longitudinal cross sectional view of an alternative embodiment of a mass flowmeter embodying the present invention, particularly illustrating the viscosity error eliminating structure of this invention.

With reference to FIGURE 3, there is shown an alternative embodiment of a flowmeter incorporating the invention, wherein a sun gear 94' is fixedly mounted on a supporting member 96' rigidly connected to the flow straightener assembly 16' and is thus restrained with respect to movement about the axis of the impeller 18'. A strain gauge 120 is mounted on the sun gear supporting member 96' to provide a means for sensing the torque exerted on the sun gear by the planet gear 92' rotatably carried by the impeller. The strain gauge may be connected to any suitable means for indicating a measurement of mass flow responsive to the output of the strain gauge.

Further, with reference to FIGURE 3, it can be seen that the outer wall 78' of the impeller is disposed closely adjacent the inner wall of the casing 10' and further that during operation of the flowmeter there will be a certain, although minimum, amount of fluid disposed between the impeller and casing. During rotation of the impeller this fluid will exert a viscous coupling between the impeller and casing, tending to resist impeller rotation and introducing an error in mass flow information. In accordance with the invention, a disc-like member 126 is mounted coaxially of the impeller within the inner wall 76' thereof for rotation with the impeller and is spaced parallel with and relatively adjacent the magnet mounting plate 82'. The disc-like magnet mounting plate 82' will, as is apparent from a consideration of FIGURE 3, be rotated in a direction the same as the direction of rotation of the impeller during operation of the drive motor. The fluid disposed between the disc-like coupling member 126 and magnet carrying plate 82' will, therefore, during operation of the flowmeter exert a viscous coupling effect between these members, tending to rotate the impeller in the direction of impeller rotation and thus tending to offset the effects of the viscous coupling between the impeller and casing, so as to reduce if not eliminate viscosity error due to the close spacing of the impeller outer wall and casing.

In the embodiment of FIGURE 1, a viscosity error eliminating structure is shown in the form of a cylindrical shroud 128 arranged concentrically about the outer wall of the impeller 18 and supported for movement with the sun gear supporting member 96. The structure for supporting the shroud 128 on member 96 may, for example, comprise a plurality of spokes, the space between the spokes permitting free flow of fluid through the fluid flow passages in the impeller and flow straightener members.

With this arrangement, viscosity drag between the impeller and shroud will be reflected by a torque on the impeller in a direction opposite its direction of rotation and by a torque on the sun gear supporting member 96 in its direction of rotation, thus offsetting this viscous drag effect with respect to mass flow information provided by the deflecting member 96. The concept and structure with respect to the shroud 128 and its arrangement does not form a part of my invention but rather forms part of an invention by one Dave B. Levins described and claimed in a copending United States application, Serial No. 814,803 filed May 21, 1959.

As will be apparent to those skilled in the art, various modifications and alternative embodiments of the structure described and shown herein may be made without departing from the spirit or scope of the invention. Accordingly, the foregoing description and drawings shall be taken in an illustrative sense only and not as limiting the invention, it being my intention that the invention is to be limited only by the appended claims and shall include all structure logically falling within the language of the appended claims.

What I claim as new and desire to secure by Letters Patent of the United States is:

1. In a fluid mass flowmeter of the single element angular momentum type, a rotatably mounted fluid accelerating impeller, a driven motor for the impeller, means including a gear train drivingly connecting the motor and impeller, a reaction member rotatably mounted for resiliently restrained movement about the impeller axis, means mounting one of the gears of said train on said reaction member for movement of said one of the gears with said reaction member about said axis and so as to provide a torque on said reaction member during rotation of the impeller by said motor, and means connected to the reaction member to sense movements thereof about said axis.

2. In a mass flowmeter of the single-element angular momentum type, a casing adapted to conduct fluid flow, a fluid accelerating impeller rotatably mounted within the casing, a drive motor for the impeller, a speed reduction gear train drivingly connecting the motor and impeller for effecting rotation of the impeller in response to operation of the motor comprising a planet gear and a sun gear, means mounting the planet gear to permit rotation thereof about an axis of revolution parallel to and displaced from the axis of the impeller and to permit rotary displacement of the planet gear axis about the impeller axis, means mounting the sun gear for engagement with the planet gear and for resiliently restrained movement thereof about the impeller axis during operation of the motor so that the sun gear mounting means is sensitive to the torque exerted on the sun gear by the planet gear during operation of the motor to drive the impeller, and flow rate measuring means connected to said sun gear mounting means to sense the torque exerted thereon by the sun gear.

3. In a mass flowmeter of the single element angular momentum type having a casing, a fluid accelerating impeller rotatably mounted within the casing, and a drive motor for the impeller, speed reduction means drivingly connecting the impeller and motor comprising an epicyclic gear train including a planet gear rotatably carried by the impeller and a sun gear supported coaxially of and separate from the impeller and engaged with the planet gear in driven relationship thereto, said sun gear being restrained with respect to movement thereto about its axis to provide for revolution of the planet gear about the axis of the impeller in response to rotation of the planet gear about its axis, and flow rate measuring means connected to the sun gear to sense the torque applied thereto by the planet gear during rotation of the planet gear about its axis.

4. In a single element mass flowmeter of the angular momentum type having a casing, a fluid accelerating impeller rotatably mounted within the casing and a drive motor for the impeller, speed reduction means drivingly connecting the impeller and motor including a planet gear rotatably carried by the impeller for rotation relative thereto about an axis extending in spaced parallel relation to the axis of the impeller, a sun gear disposed coaxially of the impeller and engaged by the planet gear in driven relationship, means mounting the sun gear for resiliently restrained movement about its axis in response to rotation of the planet gear about its axis, and flow rate measuring means connected to the sun gear for sensing the deflection thereof about its axis.

5. In a single element mass flowmeter of the angular momentum type having a casing, a fluid accelerating impeller rotatably mounted within the casing, and a drive motor for the impeller, a speed reduction gear train drivingly connecting the impeller and motor including a planet gear rotatably carried by the impeller for rotation relative thereto about an axis extending in spaced parallel relation to the axis of the impeller, a sun gear disposed coaxially of the impeller and engaged by the planet gear in driven relationship, means supporting the sun gear for restrained movement, and flow rate measuring means connected to the sun gear for sensing the torque applied thereto by the planet gear during rotation of the planet gear.

6. In a single element mass flowmeter of the angular momentum type having a casing, a fluid accelerating impeller rotatably mounted within the casing, and a drive motor for the impeller, a speed reduction gear train drivingly connecting the impeller and motor including a planet gear rotatably carried by the impeller for rotation relative thereto about an axis extending in spaced parallel relation to the axis of the impeller, a sun gear disposed coaxially of the impeller and engaged by the planet gear in driven relationship, means supporting the sun gear for movement about its axis of rotation relative to the impeller, a spring connected between the casing and sun gear and restraining movement of the sun gear about its axis, and a position telemetering device connected to the sun gear and responsive to deflections of the sun gear about its axis.

7. An angular momentum type mass flowmeter adapted to measure mass flow of the fluid in both of opposite directions of the fluid flow through a conduit comprising a cylindrical casing adapted to be coupled in a fluid conduit, a pair of fluid flow straighteners disposed within opposite ends respectively of the casing, a fluid accelerating impeller rotatably mounted within the casing between the flow straighteners, a drive motor enclosed in one of said straighteners, a speed reduction gear train drivingly connecting the motor and impeller including a planet gear rotatably carried by the impeller and a sun gear disposed coaxially of the impeller and engaged by the planet gear in driven relationship, means supporting the sun gear on one of said flow straighteners for resiliently restrained limited movement of the sun gear about its axis, and flow rate measuring means to sense the movements of the sun gear about its axis.

8. In an angular momentum type mass flowmeter, a casing adapted to conduct fluid, a drive motor supported in fluid sealed relationship within the casing, a fluid accelerating impeller rotatably supported within the casing, the impeller having a plurality of circularly arranged fluid passages extending longitudinally and concentrically of the impeller axis and spaced radially outwardly thereof, a speed reduction gear train drivingly connecting the impeller and motor including a driven planet gear carried by the impeller for rotation relative thereto about an axis extending in radially spaced parallel relation to the impeller axis, a sun gear engaged by the planet gear in driven relationship, means supporting the sun gear on the casing coaxially of the impeller and restraining the sun gear with respect to movements thereof about its axis, and flow rate measuring means connected to the sun gear to sense the torque exerted thereon by the planet gear during operation of said motor.

9. In an angular momentum type mass flowmeter, a casing adapted to conduct fluid and having an internal cylindrical wall, a cylindrical fluid accelerating impeller rotatably supported coaxially within the confines of said wall, a drive motor for the impeller, the outer diameter of the impeller being sufficiently closely spaced relative to said wall that fluid disposed in the space between the impeller and wall will during rotation of the impeller exert a viscous coupling between the wall and impeller tending to resist impeller rotation, means drivingly connecting the motor and impeller including a viscous coupling member connected to the motor for rotation by the motor in the impeller direction of rotation, and a second viscous coupling member mounted coaxially of the impeller for rotation therewith, the coupling members having a pair of surfaces disposed in parallel closely spaced relation so that fluid disposed between said surfaces will during rotation of the impeller by the motor exert a viscous coupling between said coupling members tending to offset the effect of the coupling between said impeller and wall.

10. In an angular momentum type mass flowmeter, a casing adapted to conduct fluid and having an internal cylindrical wall, a cylindrical fluid accelerating impeller rotatably supported coaxially within the confines of said wall, a drive motor for the impeller, the outer diameter of the impeller being sufficiently closely spaced relative to said wall that fluid disposed in the space between the impeller and wall will during rotation of the impeller exert a viscous coupling between the wall and impeller tending to resist impeller rotation, a magnetic coupling for connecting the motor and impeller including a plurality of driven magnets, means mounting the magnets for rotation coaxially of the impeller including a disc-like member disposed coaxially of the impeller, the driven magnets being drivingly connected to the impeller to provide for rotation of the impeller and said disc-like member in the same direction, and a second disc-like member disposed coaxially of the impeller for rotation therewith and disposed in parallel closely spaced relation to the first mentioned member so that fluid disposed between the disc-like members will exert a viscous drag on the impeller in the direction of impeller rotation.

11. In an angular momentum type mass flowmeter, a casing adapted to conduct fluid, a fluid accelerating impeller mounted within the casing, means to drive the impeller, a deflecting member movable about an axis in proportion to the momentum imparted to fluid flowing through the casing by the impeller, and means supporting the deflecting member including a bearing having an inner and outer race and bearing members movably engaged between the races, one of said races being fixed to the deflecting member for the movable support of the same, the other of the races being connected to the impeller drive means for rotation of the other race by the impeller drive means.

12. In a single element angular momentum type mass flowmeter, a casing adapted to conduct fluid, a fluid accelerating impeller rotatably mounted within the casing, speed reduction means to drive the impeller including an epicyclic gear train having a planet gear rotatably carried by the impeller and a sun gear disposed coaxially of the impeller and engaged in driven relationship by said planet gear, means rotatably supporting the sun gear including a shaft extending coaxially of the sun gear and rotatively connected to the impeller drive means and a bearing having an inner race fixed to the shaft, an outer race supporting the sun gear, and bearing members movably engaged between the races, and means resiliently restraining movement of the sun gear about its axis of rotation.

13. In a fluid mass flowmeter of the single-element angular momentum type, a casing adapted to conduct fluid flow, a fluid accelerating impeller rotatably mounted within the casing, a drive motor for the impeller, a speed reduction gear train connecting said motor to said impeller in driving relation, said gear train comprising a gear mounted to permit rotation about an axis of revolution parallel to and displaced from the axis of the impeller and to permit rotary displacement of the gear axis about the impeller axis, and flow rate measuring means comprising a resiliently restrained member connected to said gear so as to deflect about the impeller axis in accordance with the reaction torque exerted on said gear.

References Cited in the file of this patent

UNITED STATES PATENTS

| | | |
|---|---|---|
| 2,357,003 | Hurndall | Aug. 29, 1944 |
| 2,444,363 | Newcomb | June 29, 1948 |
| 2,529,481 | Brewer | Nov. 14, 1950 |
| 2,714,310 | Jennings | Aug. 2, 1955 |
| 2,812,661 | Cox | Nov. 12, 1957 |
| 2,814,949 | Bodge | Dec. 3, 1957 |
| 2,857,761 | Bodge | Oct. 28, 1958 |